(12) United States Patent
Esman et al.

(10) Patent No.: US 10,523,329 B2
(45) Date of Patent: Dec. 31, 2019

(54) COMB-ASSISTED CYCLOSTATIONARY ANALYSIS

(71) Applicant: THE REGENTS OF THE UNIVERSITY OF CALIFORNIA, Oakland, CA (US)

(72) Inventors: Daniel Esman, San Diego, CA (US); Vahid Ataie, San Diego, CA (US); Ping Piu Kuo, San Diego, CA (US); Nikola Alic, La Jolla, CA (US); Stojan Radic, San Diego, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 3 days.

(21) Appl. No.: 15/806,179

(22) Filed: Nov. 7, 2017

(65) Prior Publication Data
US 2018/0131445 A1    May 10, 2018

Related U.S. Application Data

(60) Provisional application No. 62/418,753, filed on Nov. 7, 2016.

(51) Int. Cl.
*H04B 10/516* (2013.01)
*H04B 10/69* (2013.01)
*H04B 10/079* (2013.01)

(52) U.S. Cl.
CPC ..... *H04B 10/5161* (2013.01); *H04B 10/0795* (2013.01); *H04B 10/697* (2013.01)

(58) Field of Classification Search
CPC .......................... H04B 10/0795; H04B 10/697
See application file for complete search history.

(56) References Cited

U.S. PATENT DOCUMENTS

| | | |
|---|---|---|
| 5,210,631 A | 5/1993 | Huber et al. |
| 5,963,567 A | 10/1999 | Veselka et al. |
| 6,590,910 B2 | 7/2003 | Lin |
| 6,879,433 B1 | 4/2005 | Yamashita et al. |
| 6,920,263 B2 | 7/2005 | Tadakuma et al. |
| 7,068,943 B2 | 6/2006 | Korolev et al. |
| 7,099,541 B2 | 8/2006 | Terahara et al. |
| 7,164,526 B2 | 1/2007 | McKinstrie et al. |
| 7,245,833 B1 | 7/2007 | Volkening |
| 7,315,697 B2 | 1/2008 | Smilanski et al. |
| 7,440,112 B2 | 10/2008 | Kurokawa et al. |
| 7,483,608 B2 | 1/2009 | Inoue et al. |
| 7,650,080 B2 | 1/2010 | Yap et al. |
| 8,275,263 B1 | 9/2012 | Franklin |

(Continued)

OTHER PUBLICATIONS

Ataie, v., et al., "Ultrafast Absolute Ranging by Coherent Parametric Comb," in Optical Fiber Communication Conference, OSA Technical Digest (online) (Optical Society of America, 2013), paper OTh3D.2.

(Continued)

*Primary Examiner* — Mina M Shalaby
(74) *Attorney, Agent, or Firm* — Eleanor Musick; Musick Davison LLP

(57) ABSTRACT

A photonically-assisted cyclostationary analyzer eliminates the need for high-bandwidth digitization and real-time Fourier processors by using mutually-coherent frequency combs to generate a Fourier representation of the received signal in a computation-free manner.

24 Claims, 10 Drawing Sheets
(8 of 10 Drawing Sheet(s) Filed in Color)

(56) References Cited

U.S. PATENT DOCUMENTS

| | | |
|---|---|---|
| 8,447,155 B1 | 5/2013 | Kuo et al. |
| 8,451,528 B1 | 5/2013 | Kuo |
| 8,611,759 B1 | 12/2013 | Kvavle et al. |
| 9,106,325 B2 | 8/2015 | Ataie et al. |
| 9,287,993 B1 | 3/2016 | Adleman et al. |
| 2002/0071454 A1 | 6/2002 | Lin |
| 2002/0164135 A1 | 11/2002 | Tadakuma et al. |
| 2003/0026527 A1 | 2/2003 | Takahashi et al. |
| 2004/0184815 A1 | 9/2004 | Korolev et al. |
| 2005/0129412 A1 | 6/2005 | Centanni et al. |
| 2006/0002715 A1 | 1/2006 | Igarashi et al. |
| 2006/0061853 A1 | 3/2006 | Chraplyvy et al. |
| 2007/0206950 A1 | 9/2007 | Liu et al. |
| 2007/0280613 A1 | 12/2007 | Inoue et al. |
| 2008/0226301 A1 | 9/2008 | Alic et al. |
| 2008/0285606 A1 | 11/2008 | Kippenberg et al. |
| 2009/0079967 A1 | 3/2009 | Radic |
| 2010/0284431 A1 | 11/2010 | Inoue |
| 2012/0257270 A1 | 10/2012 | Kuo et al. |
| 2013/0051807 A1 | 2/2013 | Huang et al. |
| 2013/0223459 A1 | 8/2013 | Radic |
| 2013/0314767 A1 | 11/2013 | Kuo et al. |
| 2014/0253915 A1 | 9/2014 | Ataie et al. |
| 2014/0254619 A1 | 9/2014 | Ataie et al. |
| 2014/0270783 A1 | 9/2014 | Prather et al. |
| 2014/0341265 A1 | 11/2014 | Alic et al. |
| 2017/0019178 A1 | 1/2017 | Alic et al. |
| 2017/0049381 A1 | 2/2017 | Lieber et al. |
| 2017/0115333 A1 | 4/2017 | Radic |

OTHER PUBLICATIONS

Bernhardt, B., et al.; "Cavity-enhanced dual-comb spectroscopy", Nature Photonics, Nov. 29, 2009 (published on-line), 4, 55-57.

Bres, C-S., et al.; "Reconfigurable parametric channelized receiver for instantaneous spectral analysis", Optic Express, Feb. 14, 2011, vol. 19, No. 4, pp. 3531-3541.

Coddington, I., et al.; "Coherent Multiheterodyne Spectroscopy Using Stabilized Optical Frequency Combs", Physical Review Letters, Jan. 11, 2008, vol. 100, 13902-1-13902-4.

Coddinton, I., et al.; "Rapid and precise absolute distance measurements at long range", Nature Photonics, Jun. 2009, vol. 3, pp. 351-356.

Gohle, C., et al.; Frequency Comb Vernier Spectroscopy for Broadband, High-Resolution, High-Sensitivity Absorption and Dispersion Spectra, Physical Rev. Letters, Dec. 31, 2007, vol. 99, 263902-1-263901-4.

Hu, J, et al., "Dynamic Digital Channelizer Based on Spectrum Sensing," PLoS One, 10(8), Aug. 26, 2015, 11 pages.

Huynh, C.K., et al.; "Noise performance of phase-insensitive multicasting in multi-stage parametric mixers", Optics Express, Jan. 14, 2013, vol. 21, No. 1, pp. 804-814.

Kuo, B.P-P, et al.; "Wideband Parametric Frequency Comb as Coherent Optical Carrier," J. Lightwave Technology, Nov. 1, 2013, vol. 31, No. 21, pp. 3414-3419.

Myslivets, E. et al., "Generation of wideband frequency combs by continuous-wave seeding of multistage mixers with synthesized dispersion," Optics Express, vol. 20, No. 3 (Jan. 30, 2012), pp. 3331-3344.

Radic, S.; "Parametric signal processing", IEEE Journal of Selected Topics in Quantum Electronics, Mar./Apr. 2012, vol. 18, No. 2, pp. 670-680. 2012.

Temprana, E., et al.; "Low-noise parametric frequency comb for continuous C-plus-L-band 16-QAM channels generation," Opt. Express 22, 6822-6828 (2014).

Tong, Z. et al.; "Spectral linewidth preservation in parametric frequency combs seeded by dual pumps", Optics Express, 20(16) Jul. 30, 2012, 17610-17619.

Wiberg et al.; "Coherent Filterless Wideband Microwave/Millimeter-Wave Channelizer Based on Broadband Parametric Mixers"; Journal of Lightwave Technology, vol. 32, No. 20, Oct. 15, 2014.

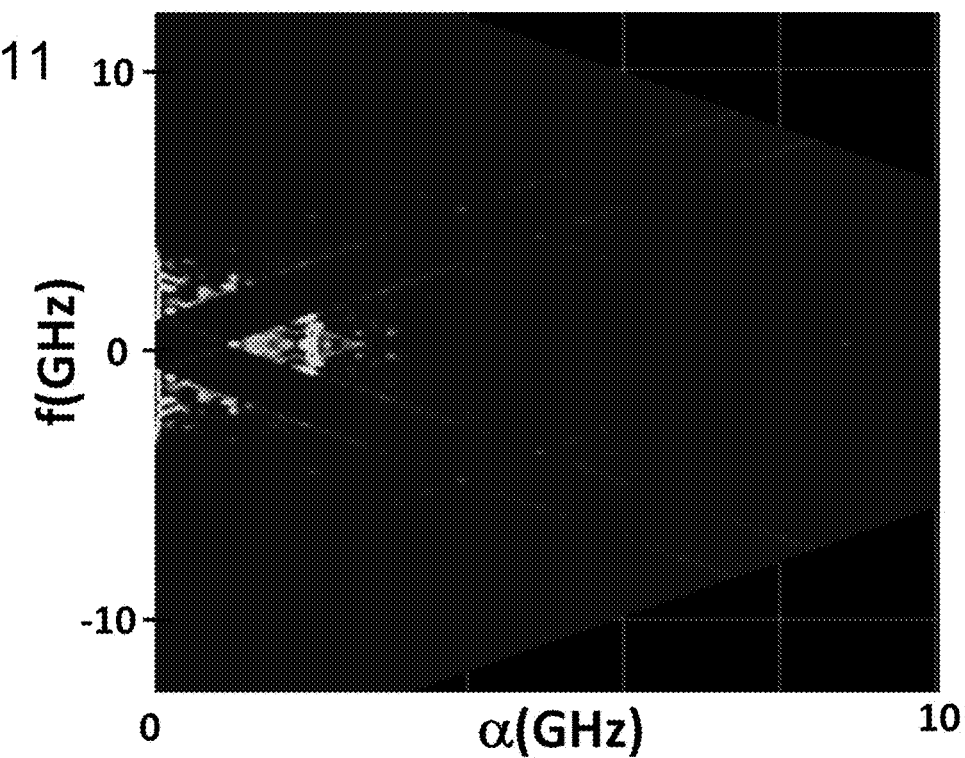

COMB-ASSISTED CYCLOSTATIONARY ANALYSIS

RELATED APPLICATIONS

This application claims the benefit of the priority of Provisional Application No. 62/418,753, filed Nov. 7, 2016, which is incorporated herein by reference in its entirety.

FIELD OF THE INVENTION

The present invention relates to a method and device for extraction of weak signals from noise.

BACKGROUND

Periodicity is omnipresent in physical as well as man-made processes. Signals arising in nearly every discipline—telecommunications, mechanics, biology, astronomy, atmospheric sciences, econometrics, nature, and more—are generally modulated, carrying corresponding signatures in both the temporal and spectral domain.

Cyclostationary processes constitute the most common class of nonstationary signals encountered in engineering and time series applications. Cyclostationary analysis, and its generalization, cumulant analysis, provide qualitatively better means for separating stochastic from deterministically-modulated radiation. Introduced nearly four decades ago, cyclostationary (CS) analysis provides means to intercept and classify a modulated waveform from a background signal such as noise or jamming. CS analysis lies at the core of electronic warfare (EW) and signal intelligence (SIGINT) intercept systems (W. A. Gardner, et al., "Cyclostationarity: Half a century of research," *Signal Proc.*, vol. 86, no. 4, pp. 639-697, April 2006). In contrast to simple spectral analysis, the CS approach provides superior spectral discrimination, allowing for considerable signal selectivity even in the presence of high levels of background noise and interference.

Signal detection, classification and interpretation (DCI) across the entire radiofrequency (RF) spectrum poses both fundamental and technological challenges. While high resolution, high-sensitivity DCI can be performed in a local (narrow-band) manner, such spectral analysis is generally not viable over the contiguous RF range (3 kHz-300 GHz) hosting modern communication and sensing applications. The wideband challenge is further compounded by the fact that emissions may contain bursty, frequency-hopping or spectrally-spread signals that complicate or prevent, even in principle, conventional averaging or fixed-band filtering techniques. As an example, a modern ultrawideband (UWB) emission is modulated at rates that exceed GHz, has a carrier that can be varied over 10s of GHz, and exists as a short duration burst. To exacerbate these problems, the signal can often be buried under intense RF traffic or may be deliberately jammed by band-matched waveforms. Similar to man-made emission, natural radiation can resemble UWB signaling in terms of bandwidth, spectral content and transience. In either case, the DCI challenge is similar: a faint signal must be detected across a wide spectral range, extracted from noise, classified, and ultimately reconstructed (demodulated) in order to extract useful content.

The wideband challenge can be addressed by devising a backplane of either a global (full-bandwidth), or multiple, spectrally-localized receivers. The former approach is clearly unrealistic for a band of interest that approaches 100 GHz or more. On the other hand, the latter strategy requires a band-tunable (scanning) or spectrally-segmented (banded) receiver architecture. A scanning approach not only does not look at the entire band in real time, but it also incorporates a tunable filter that inevitably imposes a performance limit: an increase in scanning rate is achieved at the cost of spectral resolution. In contrast, spectral segmentation (channelization) can circumvent this limitation, albeit at the expense of increased complexity: each sub-band must be served by a separate processing device and, in most cases, these need to be synchronized across the entire backplane. A conventional RF channelizer represents an example of a widely used spectrally-segmented DCI architecture. To be effective, a channelizer must combine low loss, high inter-band isolation and possess a rapid roll-off rate to avoid spectral information loss. Unlike an all-electronics channelizer, a photonic-assisted topology can address all these requirements while possessing THz-wide response—sufficiently wide to accommodate multiples of the contiguous RF spectral range. Notably, photonic-assisted channelizer architectures have been developed and used to demonstrate low-latency frequency monitoring and spectral analysis.

While near-ideal channelization is desirable, this is not sufficient for detection of UWB signals accompanied by natural or artificial interference. To detect a wideband signal in a noisy electromagnetic (EM) environment, it is necessary to discriminate a deterministic waveform from stochastic or quasi-stochastic radiation. A practical solution for noise discrimination was provided by modern CS and cumulant receivers. Intuitively elegant, CS analysis separates signal and stochastic interference using a simple criterion: a modulated waveform is periodically correlated, while noise remains inherently uncorrelated.

Unfortunately, the practical advantages of a CS analyzer fade when the signal bandwidth exceeds the speed of a viable electronic processor. Indeed, a modern CS receiver relies on a high-precision digitizer and real-time Fourier transformer in order to calculate the spectral correlation function (SCF). To analyze a wide RF range, a CS analyzer must possess an analog-to-digital converter (ADC) that matches the received signal bandwidth. In practice, this means that the detection of UWB signals emitted within a wide RF range (10s of GHz) also imposes a fundamental ADC resolution limit. At the same time, the real-time Fourier mapping of the received signal poses a more difficult technology challenge. While conventional (electronic) processors rely on a fast Fourier transform (FFT) algorithm, its complexity still prevents real-time processing at UWB rates. As a result, the combined (ADC/FFT) processing barrier imposes a strict limit on the cyclostationary receiver performance. A wideband ADC poses the first processing challenge that can be quantified in terms of precision, operating bandwidth and dissipation. Indeed, while real-time CS analyzers can be operated over sub-GHz bandwidths, none has approached a sizeable fraction of the contiguous RF range.

While an ADC capable of contiguous RF range (DC to 300 GHz) is unlikely to be constructed anytime soon, circuits operating beyond 20 GHz have been reported. Unfortunately, the advantages of CS analysis come at a cost of large computational complexity, posing fundamental detection challenges. In the case of modern ultrawideband signals, the requirements for persistent CS analysis are considerably beyond the processing complexity of conventional electronics.

BRIEF SUMMARY

The inventive cyclostationary (CS) analyzer avoids the processing challenges of prior art analyzers by eliminating the need for a high-bandwidth ADC and for computational Fourier mapping of the received emission. These important improvements are achieved by using a physically-assisted approach to complex Fourier and Hilbert transforms of a received signal, thus eliminating the need for high-rate computation that must match the rate (bandwidth) of the incoming signal. To accomplish these functions, the inventive CS analyzer incorporates mutually-coherent frequency combs to decimate the emission bandwidth and obtain the discrete Fourier transform (DFT) in the physical domain. Details of the inventive spectrum-decomposition approach are disclosed in co-pending application Ser. No. 15/642,120, filed Jul. 5, 2017, which is incorporated herein by reference.

The inventive approach performs coherent spectral decomposition of a wideband, high-speed optical signal, or an electrical signal via electrical/optical conversion, through coherent detection, without the need for narrow-band optical filtering to perform frequency slicing. Thus, rather than digitizing a wideband signal and then computing its FFT in real time, the received field is mapped to the Fourier domain in a computation-free manner. The CS analyzer front end uses two coherently-coupled frequency combs the first one acting to replicate the received radiation, and the second one providing an array of local oscillator (LO) tones, frequency-matched to each generated signal copy. The two combs possess a different frequency pitch, with the difference defining the frequency resolution of the physical pre-processor. The received RF signal is used to modulate a frequency comb and create N spectral replicas, preserving both phase and amplitude. These copies are combined with a coherent LO comb, allowing each pair to be received by a low-bandwidth detector array. The backplane array outputs the discrete Fourier transform (DFT) of the received field. The tone count of frequency combs directly controls the speed of the fastest electronic component in the processing chain.

The inventive spectral decomposition scheme incorporated into CS analyzer architecture enables real-time detection of a signal at sub-Nyquist bandwidth. The inventive approach also circumvents the bandwidth-resolution of existing or conceivable analog-to-digital converters (ADCs), and alleviates the need for synthesizing physical channelization filters with excessive spectral isolation. In conventional approaches, a perfect reconstruction of channelized signal requires the use of channelizer filters with brick-wall frequency response, which is not physically implementable. The all-DSP (digital signal processing) approach provided by the inventive method for image-rejection in coherent detection guarantees an ideal spectral response in a CS analyzer.

In one aspect of the invention, a cyclostationary (CS) analyzer includes a signal detection device for detecting an input signal; a mutually coherent frequency comb pair comprising a first comb and a second comb, the second comb having a frequency pitch offset with respect to a frequency pitch of the first comb, each comb generating a plurality of optical tones, wherein the output of the first comb has mapped thereon the input signal, and wherein the comb pair generates a plurality of overlapping optical tones; a grating configured for receiving the overlapping optical tones from the comb pair and separating each overlapping optical tone into a plurality of sub-bands; and a detector configured for receiving and converting each sub-band of the plurality into an electrical frequency component of the input signal. In some applications, the input signal may be in a radiofrequency (RF) domain and the CS analyzer further comprises a modulator for mapping the input signal onto the output of the first comb after comb generation. In certain embodiments, the modulator may be an electro-optical modulator. In other applications the input signal may be in an optical domain, and the CS analyzer further comprises a multiplexer for combining the input signal with a seed prior to comb generation. The grating may be a tunable optical filter, which in some embodiments is separately and sequentially tuned for each optical tone until each optical tone of the plurality has been filtered. The CS analyzer may further include an amplifier configured for amplifying the separated optical tones from the grating. The separated optical tones may be input into separate optical waveguide in optical communication with the detector. In some embodiments, the detector is an array of detector elements, wherein the quantity of detector elements of the plurality may be the same or less than the quantity of sub-bands of the plurality.

In another aspect of the invention, a method for cyclostationary (CS) analysis of an input signal includes: replicating the input signal onto a first optical frequency comb having a frequency pitch, the first optical frequency comb configured for generating a plurality of optical tones; generating a second optical frequency comb having a pitch offset relative to the first optical frequency comb, the first and second optical frequency combs being frequency-locked by a common seed; splitting each optical tone of the first and second combs into separate optical waveguides; receiving the output of each optical fiber at a coherent receiver, each optical waveguide carrying a separated sub-band of the input signal; and converting each received output of the optical waveguides into an electrical sub-component of the input signal. The input signal may be in a radiofrequency (RF) domain, in which case replicating comprises mapping the input signal onto the first optical frequency comb after comb generation. Alternatively, the input signal may be in an optical domain, where the input signal is combined with the seed prior to generation of the first optical frequency comb.

The step of splitting may be achieved by inputting the optical tones into a tunable optical filter, where the tunable optical filter may be separately and sequentially tuned for each optical tone until each optical tone of the plurality has been filtered. The method may further include amplifying each separated sub-band.

In still another aspect of the invention, a method for cyclostationary (CS) analysis of an input signal involves: separating the input signal into a plurality of sub-bands by modulating the input signal onto a first optical frequency comb of a mutually-coherent optical comb pair, wherein the optical comb pair comprises a second optical frequency comb having a pitch offset relative to the first optical frequency comb, and wherein each sub-band corresponds to an optical tone in a spectral domain; and detecting and converting the optical tones into electrical subcomponents of the input signal. The input signal may be in a radiofrequency (RF) domain, in which case replicating comprises mapping the input signal onto the first optical frequency comb after comb generation. Alternatively, the input signal may be in an optical domain, where the input signal is combined with a seed prior to generation of the first optical frequency comb.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

space by cyclostationary analysis to separate noise/jamming ($\alpha=0$) from a modulated signal ($\alpha\neq0$).

Figure 1A:
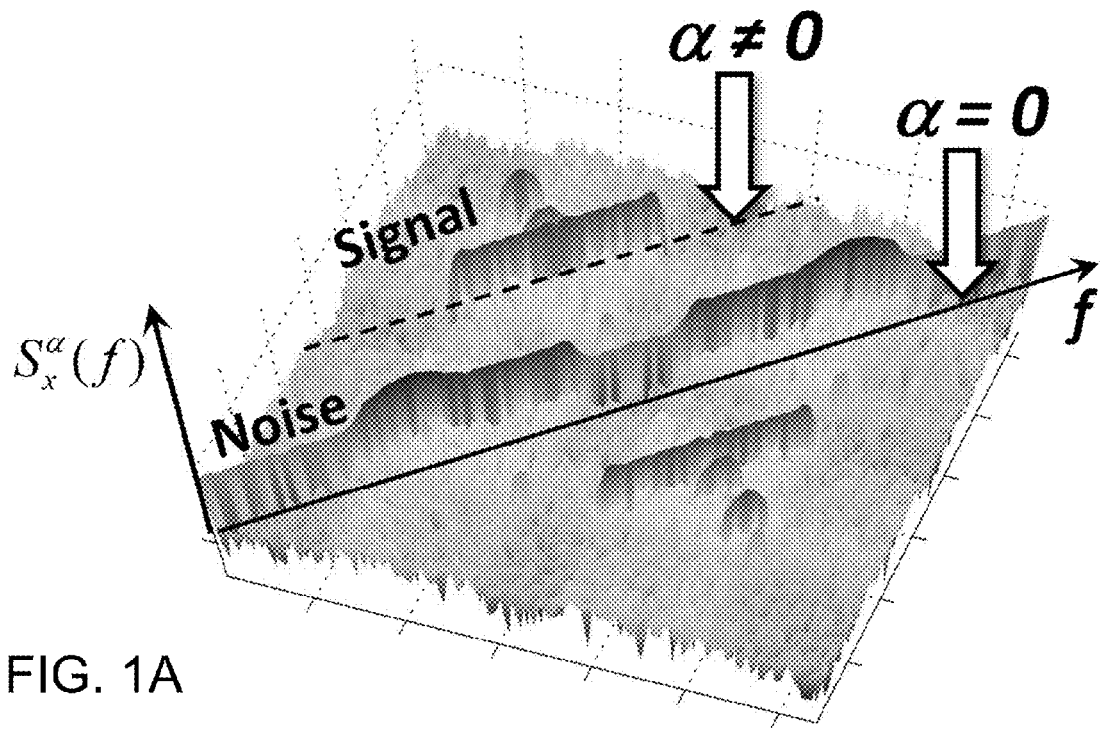
FIG. 1A shows an example of a spectral correlation function (SCF) ($S_r^\alpha(f)$) mapped in two-dimensional ($\alpha$-f)
Figure 1B:
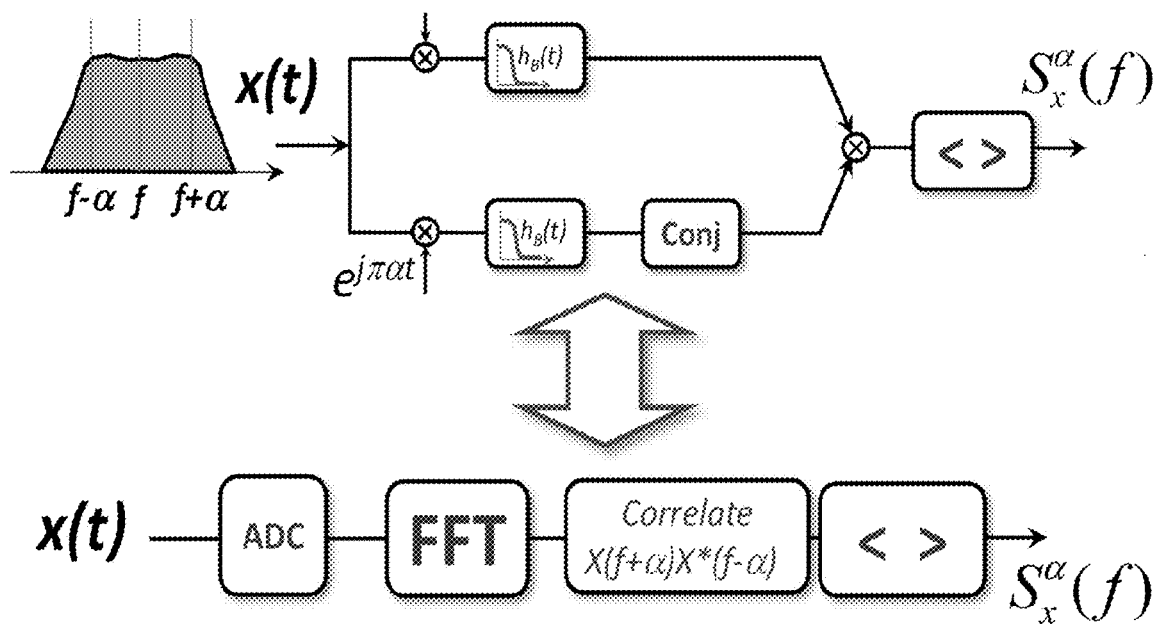

FIG. 1B diagrammatically illustrates an intercept receiver computing FFT to discriminate signal from noise/jamming.

Figure 2:
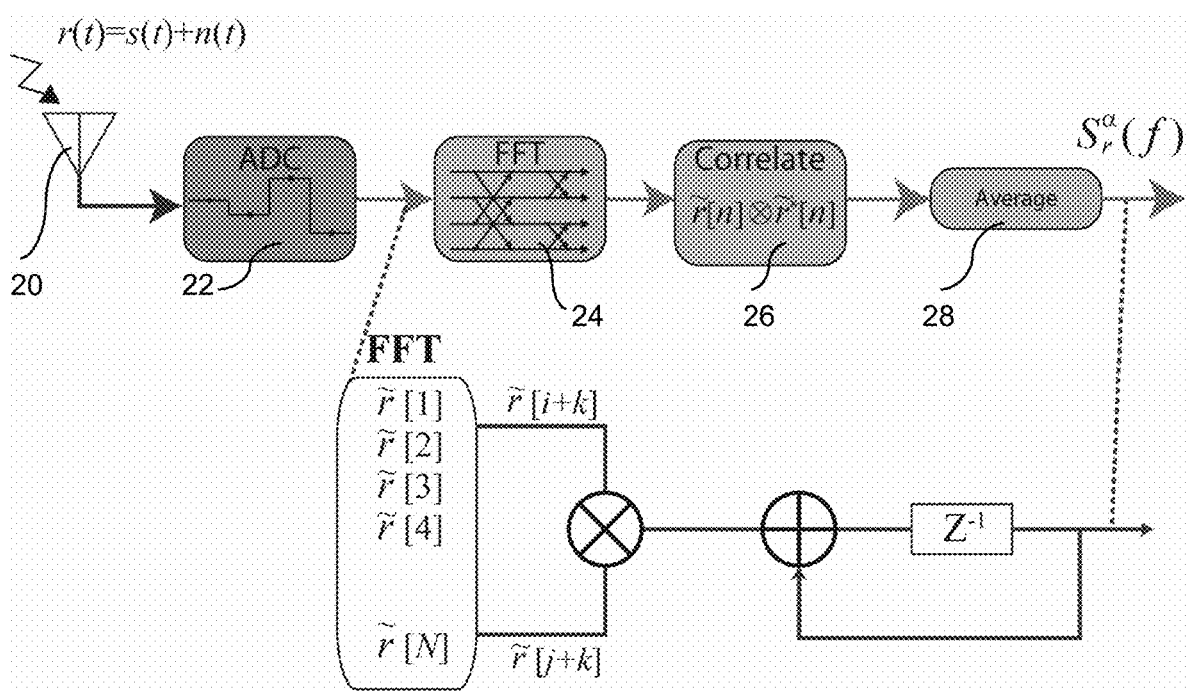

FIG. 2 is a schematic showing a conventional CS receiver architecture.

Figure 3A:
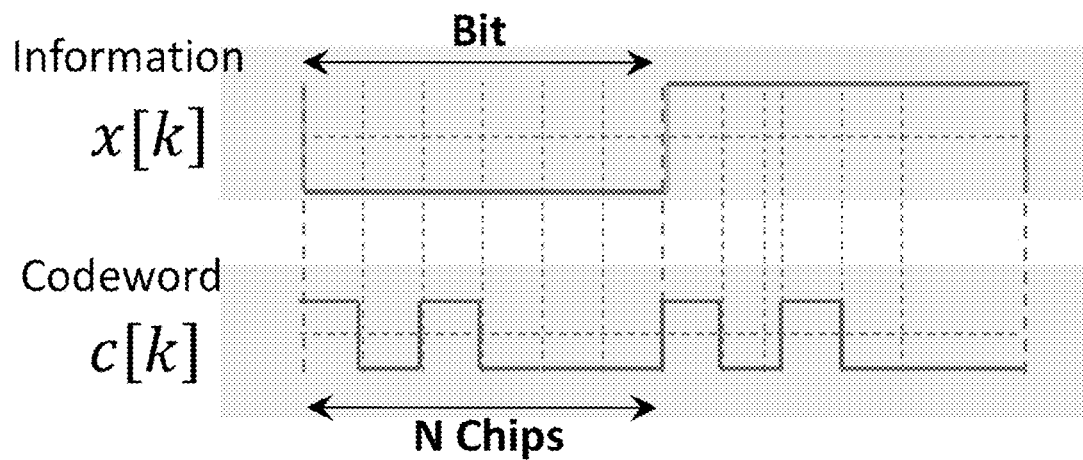
Figure 3B:
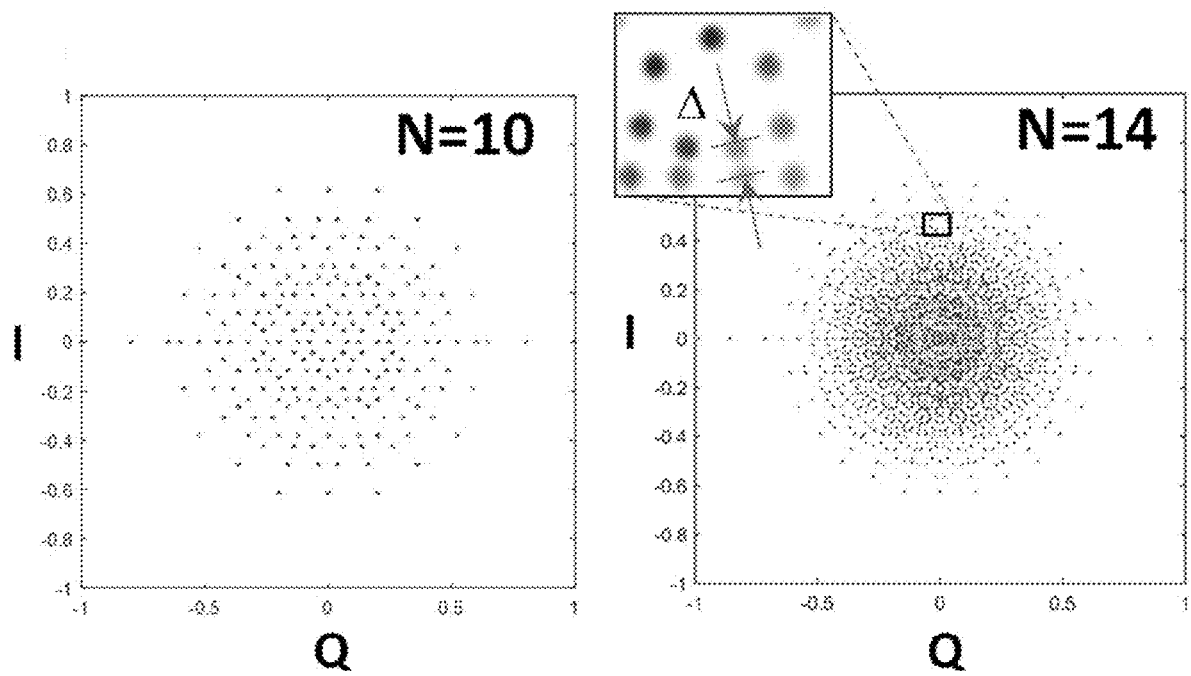

FIG. 3A diagrammatically illustrates a spread-spectrum channel carrying information x[k] modulated using a codeword c[k]; FIG. 3B illustrates the spread-spectrum signal represented in Fourier domain, where all possible realizations of direct-sequence coding are plotted for codeword of length N=10 (left) and N=14 (right).

Figure 4:
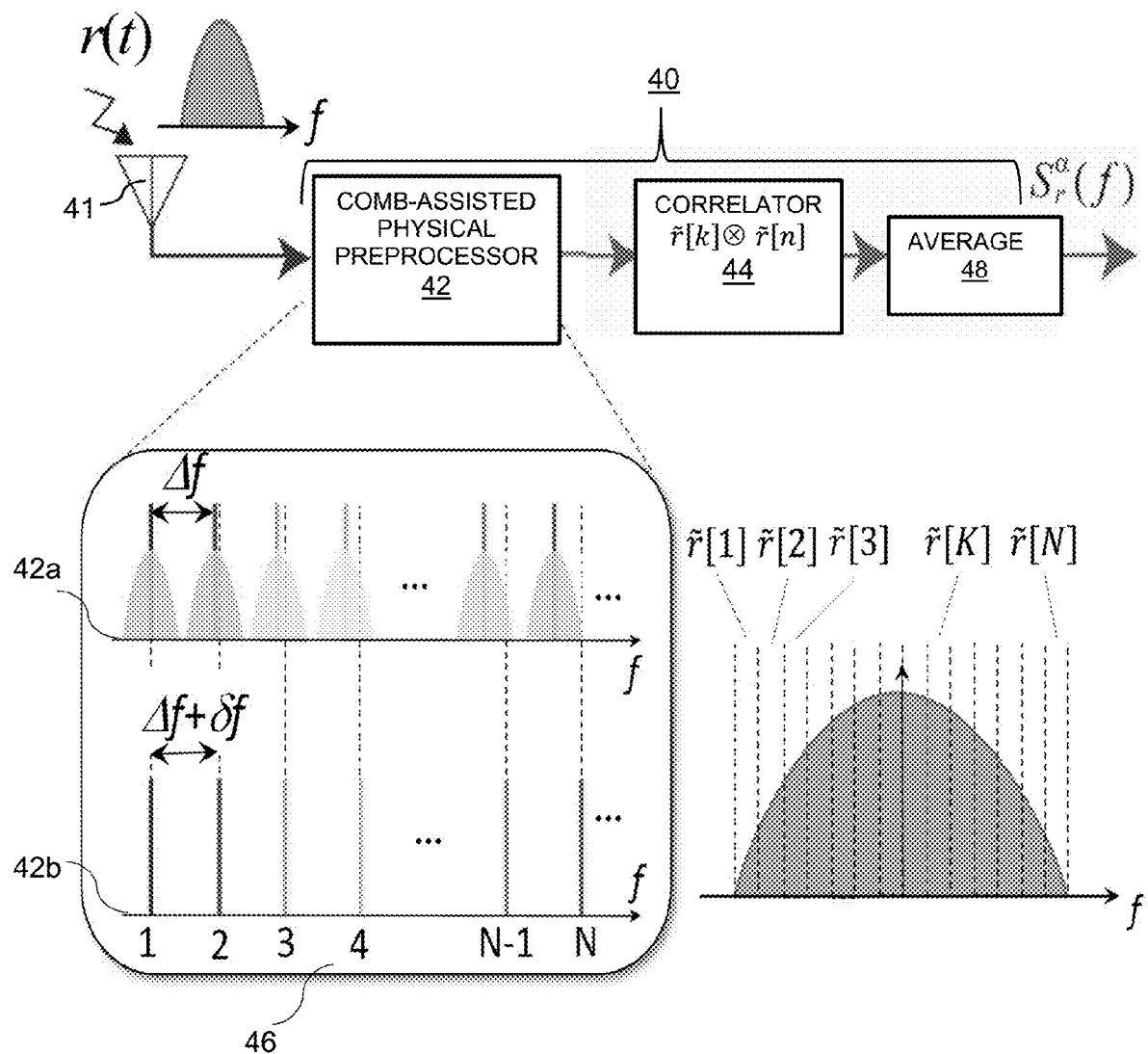

FIG. 4 is a diagram of a comb-assisted CS analyzer architecture according to an exemplary embodiment of present invention.

Figure 5A:
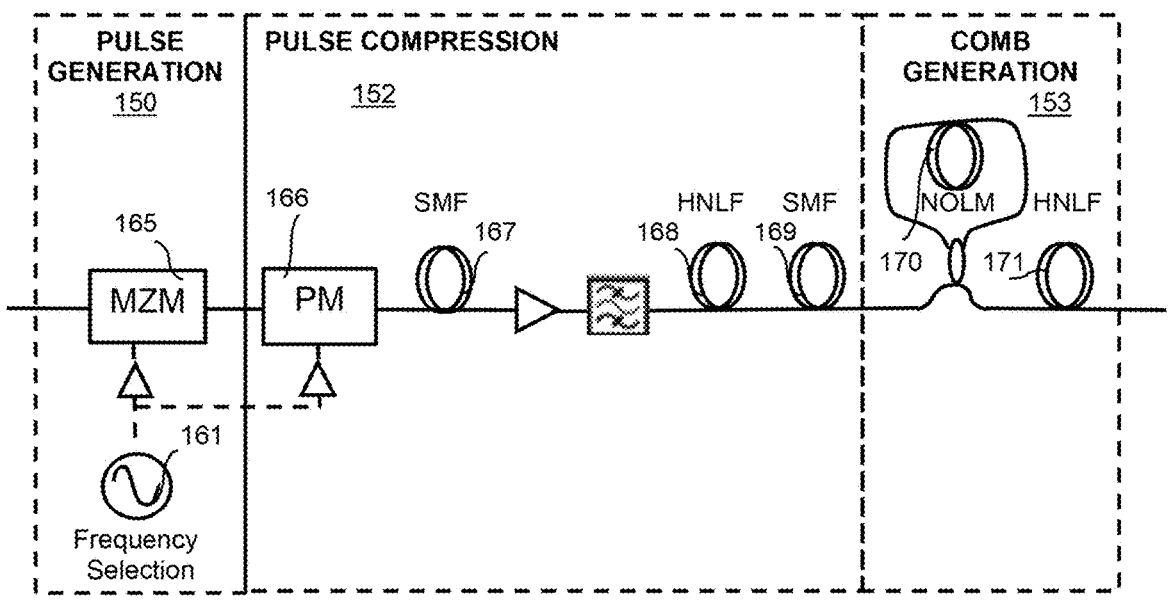

FIG. 5A shows an exemplary implementation of a tunable optical comb generator.

Figure 5B:
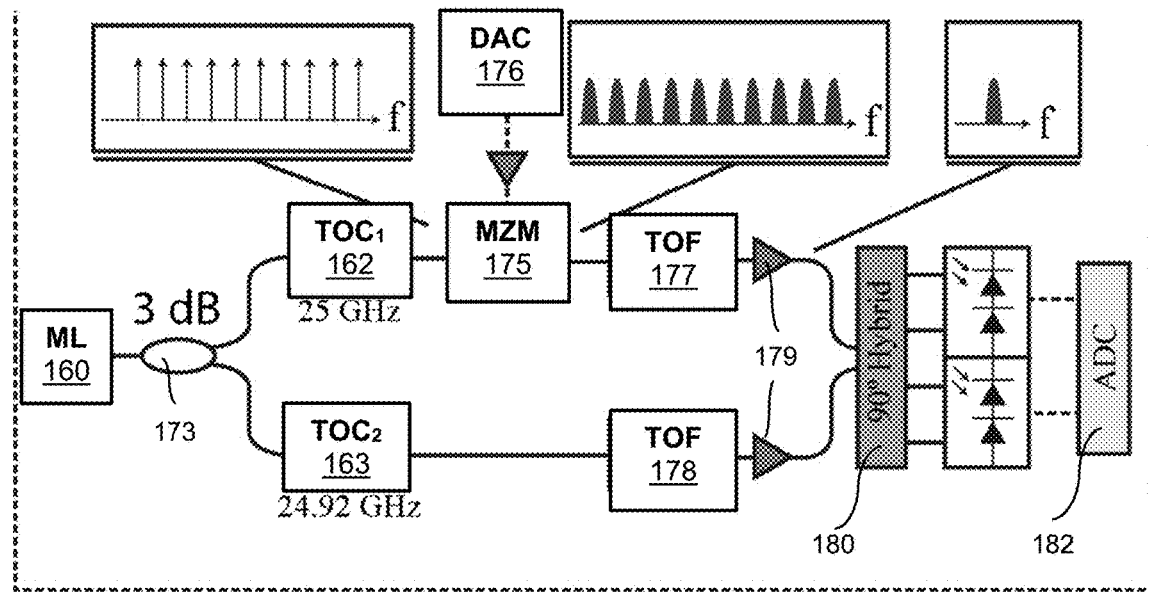

FIG. 5B is a diagram of an experimental setup of a CS analyzer incorporating a mutually-coherent frequency comb in a test implementation of the invention.

Figure 6:
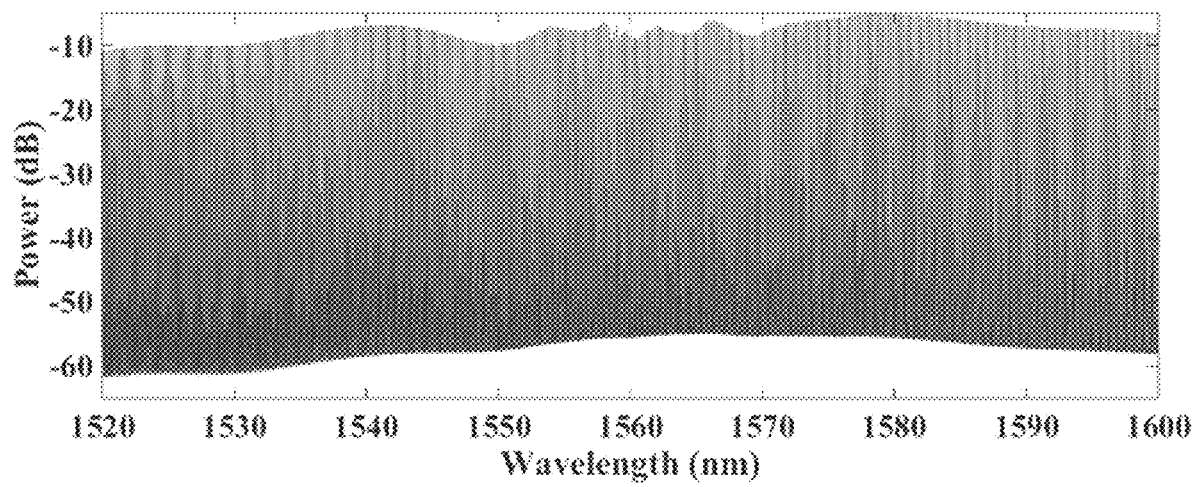

FIG. 6 shows measurement results for a constructed 25 GHz pitched tunable optical frequency comb with measurement performed in 0.02 nm resolution bandwidth.

Figure 7:
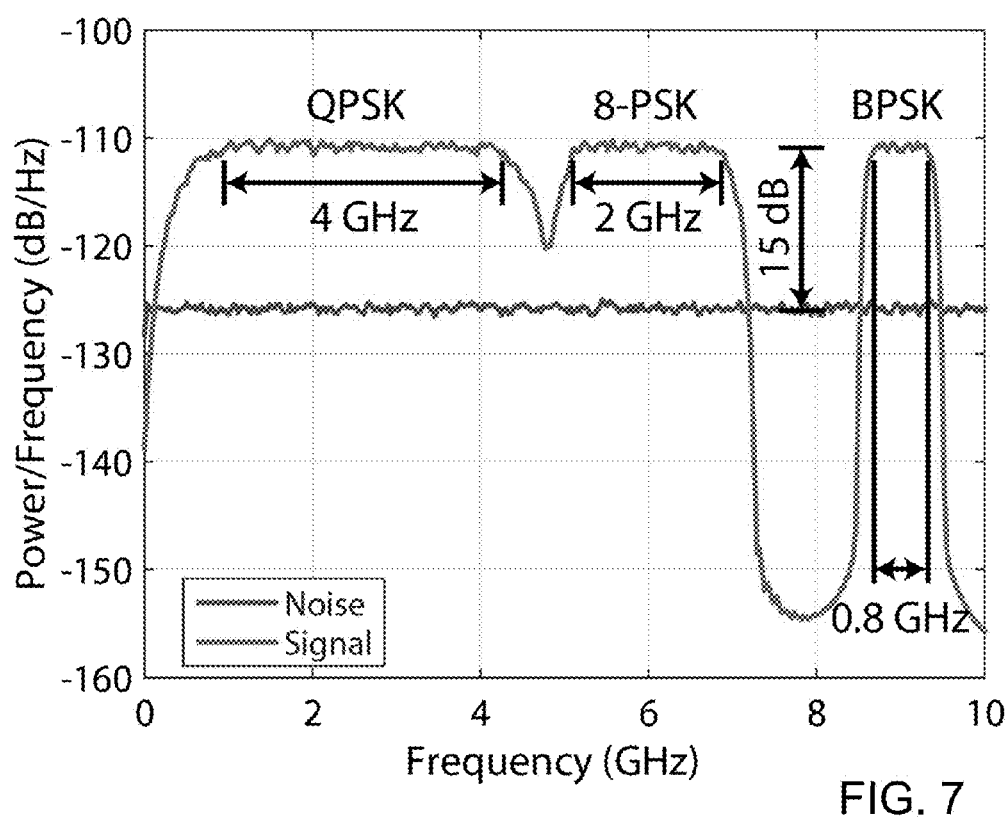

FIG. 7 shows an electrical 15 dB SNR input spectrum consisting of 4 GHz QPSK signal at 2.5 GHz carrier frequency, 2 GHz 8-PSK signal at 6 GHz carrier frequency, and 800 MHz BPSK signal at 9 GHz carrier frequency.

Figure 8A:
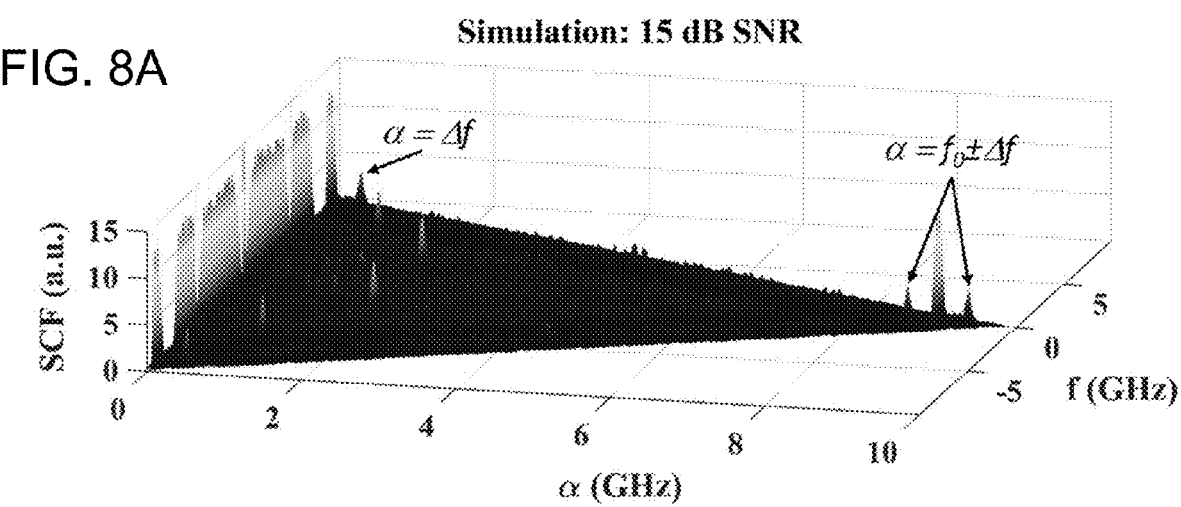
Figure 8B:
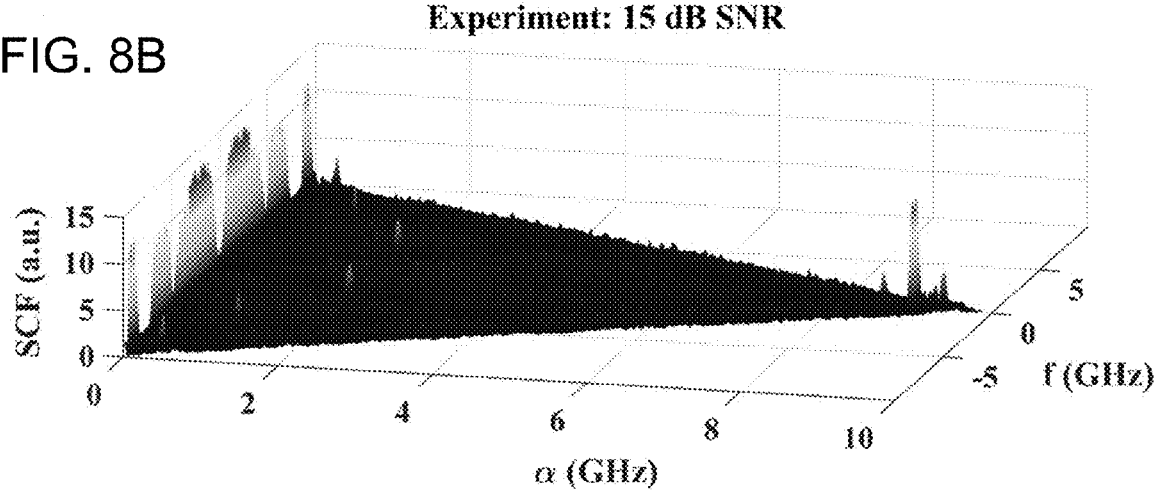

FIGS. 8A and 8B show simulated and experimental SCF results with 250 point DFT and 15 dB SNR, respectively. BPSK features at $\Delta f$ and $f_0 \pm \Delta f$ are distinguished.

Figure 9A:
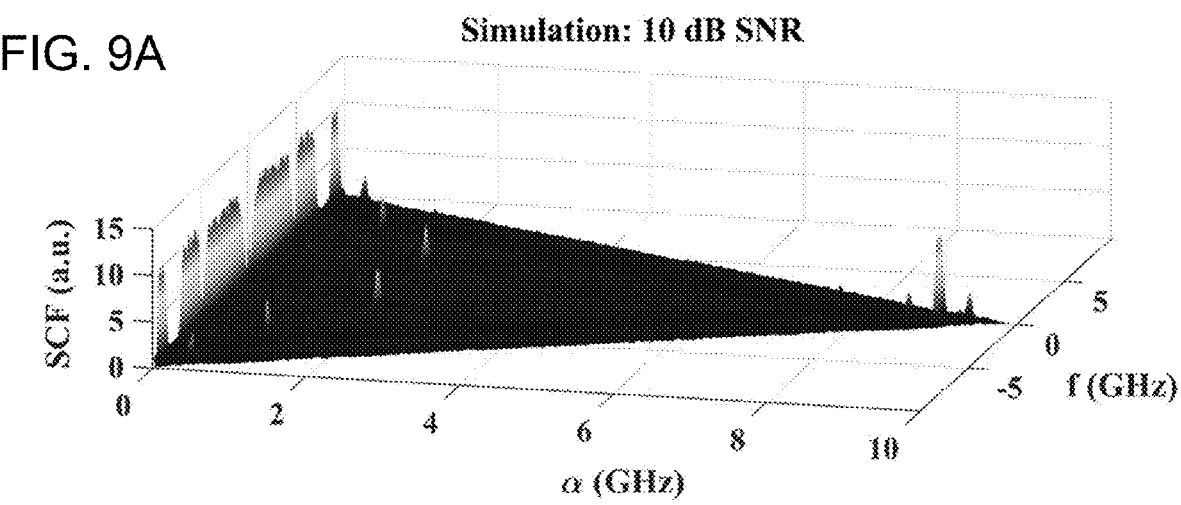
Figure 9B:
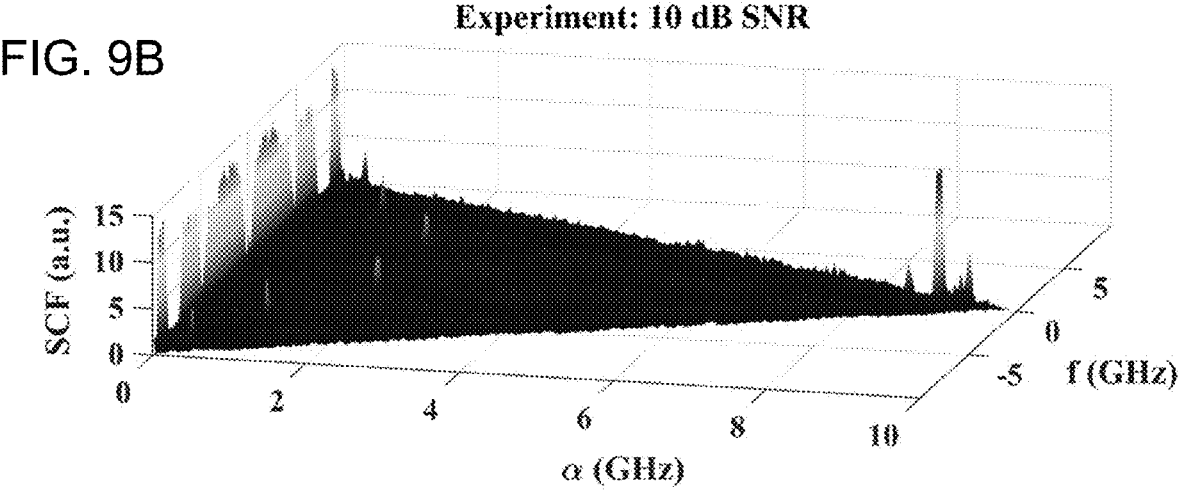

FIGS. 9A and 9B show simulated and experimental SCF results with 250 point DFT and 10 dB SNR, respectively.

Figure 10A:
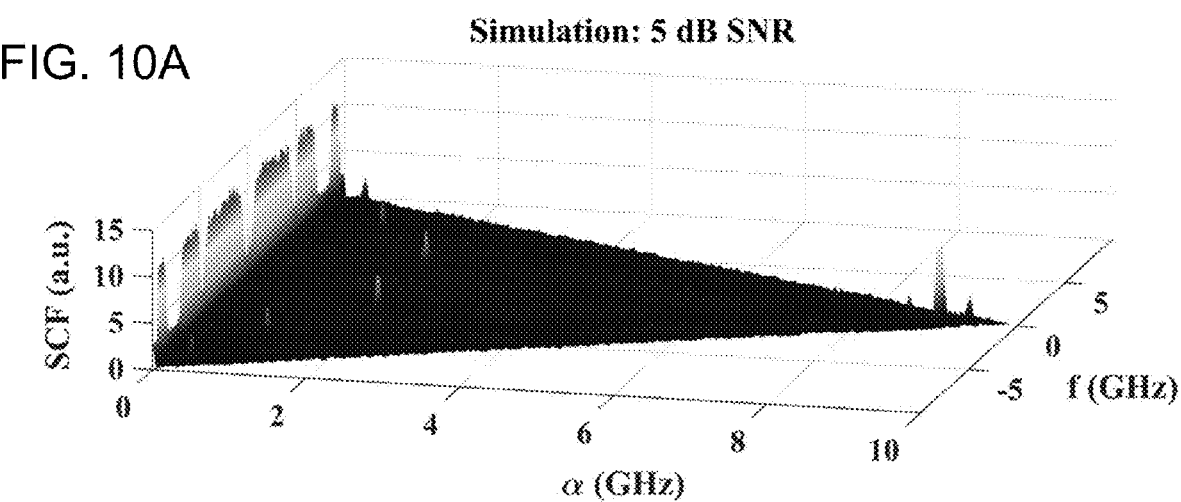
Figure 10B:
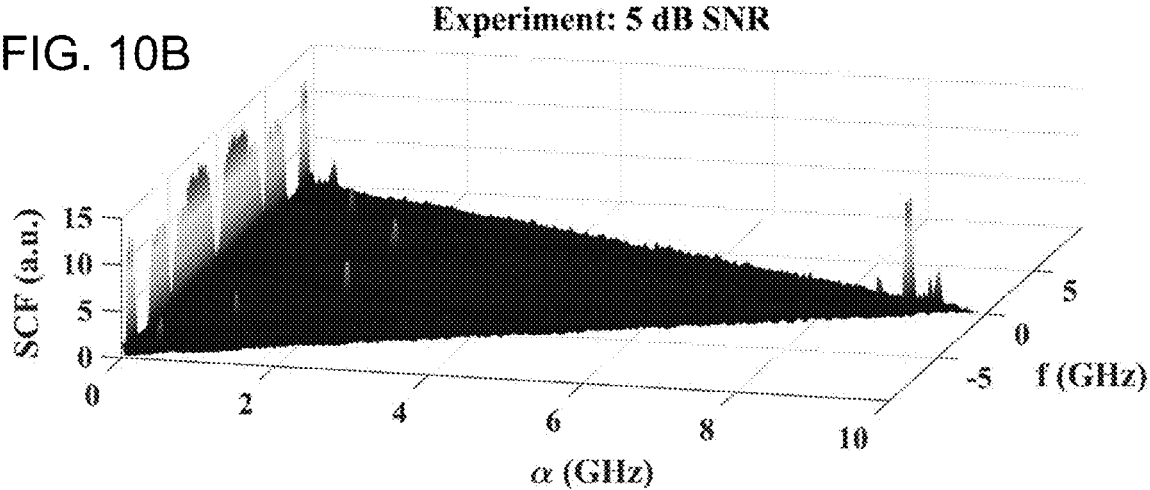

FIGS. 10A and 10B show simulated and experimental SCF results with 250 point DFT and 5 dB SNR, respectively.

FIG. 11 shows the SCF measured output generated by 2 GHz BPSK signal stimulus at a 2 GHz carrier frequency according to an embodiment of the present invention.

DETAILED DESCRIPTION OF EMBODIMENTS OF THE INVENTION

A CS receiver separates signal from noise (interference) by taking advantage of the cyclical nature of the modulation format. To illustrate this principle, assume that the received radiation r(t) can be written as a summation of modulated signal s(t) and noise n(t) contributions:

$$r(t) = \sum_m \prod (mT)B(t-mT) + n(t), \qquad (1)$$

where $\Pi$ denotes a cycle modulation waveform with modulation cycle duration T and encoded data by B. While the modulated signal portion of the received field is not strictly periodic, its autocorrelation $R_r(t,\tau)=\langle r(t)r(t-\tau)'\rangle$ is:

$$R_r(t,\tau) = R_r(t+T,\tau). \qquad (2)$$

Since the autocorrelation is temporally periodic, one can define the Fourier transform using the auxiliary variable $\alpha$:

$$R_r^\alpha(\tau) = \lim_{T\to\infty} \frac{1}{T} \int_T r\left(t+\frac{\tau}{2}\right) r\left(t-\frac{\tau}{2}\right)^* e^{-j2\pi\alpha t} dt. \qquad (3)$$

Finally, by mapping the last expression to the Fourier domain:

$$S_r^\alpha(f) = \int_{-\infty}^\infty R_r^\alpha(\tau) e^{-j2\pi f\tau} d\tau, \qquad (4)$$

one has defined the well-known spectral correlation function (SCF) that represents a complex transform in 2-dimensional $\alpha$-f space. A typical SCF function that operates on multiple signals is illustrated in FIG. 1A, in the case when accompanying noise is near-achromatic. The upper portion of the figure depicts the functional steps executed on the received waveform x(t) to map the incoming signal to the Fourier domain, which the lower portion of the figure shows the functional components, as will be described further with reference to FIG. 2.

The SCF plot in FIG. 1A facilitates intuitive understanding of the power of cyclostationary analysis. In cases in which the received waveform is white noise, its spectral components exhibit no correlation, requiring that the SCF function vanishes for $\alpha\neq0$. This is apparent in FIG. 1A, where the plotted power density corresponding to noise contribution is almost entirely confined at $\alpha=0$ (labeled "NOISE" in the figure.) Conversely, signal features are prominent at non-zero $\alpha$ locations ($\alpha$-f plane) ("SIGNAL"), providing for effective discrimination means between signal and noise. Unfortunately, to obtain SCF mapping like that shown in FIG. 1A, a conventional CS analyzer must use a chain of high-complexity processing blocks, which are shown in FIG. 2. The received signal at antenna 20 is first digitized at ADC 22, then subsequently mapped to the Fourier domain via FFT 24. After the spectral representation is obtained, spectral correlation 26 is computed and averaged 28 in order to generate the two-dimensional SCF representation $S_r^\alpha(f)$, discriminating the noise. The wideband ADC 22 poses the first processing challenge that can be quantified in terms of precision, operating bandwidth and dissipation. While an ADC capable of contiguous RF range is unlikely to be constructed in the near future, circuits operating beyond 20 GHz have been reported. If we assume that an RF bandwidth of 100 GHz can be addressed by a combination of multiple ADC stages, such a compound digitizer would still dissipate nearly 100 Watts.

Even if this were acceptable in a select set of CS applications, the effective number of bits (ENOB) of such a digitizer would strictly limit its utility. Indeed, while recently reported ADC demonstrations were performed at rates above 20 GHz these still possess ENOB~7. Limited digitizer precision is highly problematic since it precludes, even in principle, classification of a high-complexity or closely spaced signals.

While an ADC imposed limit might indeed appear formidable, it is both the computational complexity and precision of the FFT processor as well as the computation of the correlation over large bandwidths that sets the fundamental limit on any CS construction. While much work has been done to reduce the computational complexity of the correlation computation, they still rest on a high precision, fast FFT. To understand this important notion, consider a case when one must detect and classify a spread-spectrum signal in presence of noise or interference, as illustrated in FIG. 3A.

A spread-spectrum channel carrying information x[k] (at $k^{th}$ bit of the transmitted stream) is modulated using a codeword c[k] at a much higher rate (chip-rate)[23]. To understand the FFT-imposed limit, consider having to identify two different users each using two distinct codewords. In the complex Fourier plane (FIG. 3B, left): with an increase in the length of codeword N, the distance between the complex coefficients of the codeword in the I-Q plane decreases. To distinguish between different codes, the receiver must resolve closest-spaced points in Fourier space, dictating the required precision for FFT. A long codeword means high precision. As an upper bound to the precision required to distinguish between two signals modulated by different codewords, it is necessary to resolve the two furthest points between codewords in I-Q constellations, as shown in FIG. 3B, right, inset. In practical terms, this means that FFT precision at a very minimum must also match or exceed the largest distance between two codeword points in the I-Q plane. Undeniably, this least upper bound on FFT precision will be more stringent in a more practical situation. This can be understood in the case when signal time of arrival is unknown, yielding a complex rotation and distortion among each of the codewords in the complex Fourier plane. This, in turn, greatly reduces the distance between two coefficients, and hence, mandates a much higher FFT precision. While high precision is indeed possible in conventional electronic FFT processors, operating at sub-GHz rates, this is not viable at rates of interest for practical CS analysis (10s of GHz) that remain substantially higher. The complexity-bandwidth FFT limit is deceptively similar to the familiar argument used in general-purpose processors, where one hopes to match any processing gain by decrease in feature size. Unfortunately, this cannot be made in case of FFT CMOS architecture that underpins nearly all CS processors. An FFT algorithm critically relies on multiplication and addition operations, with a multiplier CMOS cell dominating its dissipation. In addition, any increase in FFT bit precision imposes a quadratic increase in gate count. Even if one assumes that the gate increase can be accomplished with ideal gate-to-gate connectivity (i.e., zero-dissipation, at any operating rate), this effectively means that the FFT core precision still comes with quadratic dissipation law. In practical terms, a two-order increase in operating speed is likely to lead to unsurmountable connectivity loss and unsustainable heat dissipation.

Recognizing the fundamental limits imposed on both the ADC and FFT processing cores in a CS receiver, the inventive approach eliminates both stages. Rather than digitizing a wideband signal and then computing its FFT in real time and at high precision, the received field is mapped to the Fourier domain in a computation-free manner, as shown in FIG. 4. The new CS analyzer 40 includes a front end having a comb-assisted physical pre-processor 42 with two coherently-coupled frequency combs; the first comb 42a serves to replicate the received radiation at receiver 41, while the second comb 42b provides an array of local oscillator (LO) tones, frequency-matched to each generated signal copy. The two combs 42a, 42b possess a different frequency pitch, with the difference ($\delta f$) defining the frequency resolution of the physical Fourier preprocessor, which is not necessarily that of the composite CS analyzer. In contrast to incoherent spectral analyzers, the received RF signal is used to modulate a frequency comb and create N spectral replicas 46, preserving both phase and amplitude, and resulting in coherent band segmentation. These copies are combined with a coherent LO comb, allowing each pair to be received by a low-bandwidth ($\delta f$) detector array. As a result, the backplane array of comb-assisted physical preprocessor 42 outputs the discrete Fourier transforms (DFTs) of the received field (denoted as $\tilde{r}[k], k=1,N$ shown in the lower right corner of FIG. 4) to correlator 44. The tone-count of frequency combs directly controls the speed of the fastest electronic component in the processing chain. Additional details for implementing a mutually-coherent optical frequency comb for use in the inventive CS analyzer are provided in co-pending application No. 15/642,120, filed Jul. 5, 2017, published as US2018/0006730, the disclosure of which is incorporated herein by reference in its entirety.

As an example, 100 GHz CS analysis performed by combs with moderate (1500) tone count, dictates a 60 MHz-rate electronic backplane. Remarkably, a high-precision (ENOB>10) ADC operating at this rate consumes approximately 0.2 mW, in sharp contrast to a full-band (100 GHz) device. More importantly, the need for an FFT processor is completely eliminated, thus resolving one of the most important technological limitations of a wideband CS analyzer.

The use of near-noiseless and low-distortion signal replication and subsequent frequency decomposition are unique attributes of the new cyclostationary receiver illustrated in FIG. 4. First, the received electrical signal is replicated onto a coarsely spaced ($\Delta F$) optical frequency grid. This is achieved by modulating the received electrical signal onto an optical frequency comb (signal frequency comb 42a). A second, Vernier comb 42b, referenced to the signal comb with a pitch offset $\delta f$ from $\Delta F$ is generated. The two combs were frequency locked by sharing the same master optical oscillator as a seed, and frequency-locked RF synthesizers. Each comb is then sent to unique arrayed waveguide gratings (AWG), which splits each optical mode into individual fibers. Finally, each of the overlapping comb tones is sent to a low speed coherent receiver. The selected Vernier comb line acts as a frequency-referenced local oscillator for a specific sub-band of the electrical signal, effectively down-converting the designated frequency band to baseband. The down-converted electrical frequency components are then captured by the low speed receiver. Consequently, the input electrical spectrum is completely decimated, akin to a lossless, but coherent channelization. It should be noted that the architecture, while resembling the conventional channelizer, does not have any physical filters, and, more importantly, does not operate on signal spectral power, but on the entire received field. In this respect, the preprocessor is more akin to the vector analyzer, except that it can operate in real time, without any blind intervals.

The resolution at which the frequency decomposition can be achieved is directly proportional to the number of optical frequency comb modes that are utilized. In the simplest implementation, high resolution is achieved by incorporating maximal number of optical frequency modes. It is possible to drastically reduce the number of comb tones and corresponding subrate detector elements while maintaining the same resolution.

Several techniques have been used to generate optical frequency combs, including the widely used mode-locked lasers[19], micro-resonators, and cascaded E/O modulator derived combs. As an alternative, the parametric comb generation technique can be used, and was previously shown to successfully integrate frequency reconfigurability (both center frequency and pitch), high frequency count (thousands of lines), and high spectral purity (high OSNR) at the same time[29].

A literal implementation of a comb-assisted CS architecture calls for each signal-LO pair created by the modes from the signal and reference comb to be routed by an arrayed waveguide grating (AWG) and subsequently to a bank of low speed coherent detectors. Each detector would yield a single spectral decomposition element of the received electrical field. However, to demonstrate the scalability of this architecture without fully populating the low speed detector backplane, the performance of the receiver can be rigorously characterized with a single low speed receiver. The use of a single receiver in capturing multiple channels is a well-established technique in WDM transmission, where the performance of each channel is measured sequentially at the end of the link. Applying the equivalent to WDM sequential approach, a single, low speed coherent receiver is used to successively capture each of the signal and LO modes individually. For an accurate emulation of the full-scale implementation, the received electrical noise has to be repeated during each of the successive captures. Consequently, the noise was generated in the digital domain and added to the electrical signal before being converted to the analog domain with a digital to analog converter (DAC). However, this technique, while relieving the construction from assembling the full detector array, also imposes a unique challenge in the characterization of the receiver. Firstly, the noise statistics and bandwidth will be set by the resolution and bandwidth of the DAC, respectively. Consequently, it is necessary to use a DAC with a high bandwidth and sufficient effective number of bits (ENOB) to synthesize adequate noise statistics during the characterization of the CS receiver. Secondly, the sequential signal capture imposes a unique stability challenge during the characterization of the receiver: the entire receiver, and in particular, the two optical frequency combs must remain stable during the entire capture time. To appreciate this requirement, we note that a typical signal of interest lasts nanoseconds; in contrast, sequential CS capture can last hours. This limitation is substantially mitigated by the fact that frequency-referenced combs have been derived from a single (fixed) frequency source and that no stabilized optical cavity was used anywhere in the testbed. As a result, all results reported here were easily replicable, both over short scale (minutes) and long scale (hours). This feature has particular importance in case when the entire CS analyzer must operate in harsh (airborne or spaceborne) environment subject to stress and temperature variation. Intuitively, the observed stability is rooted to a simple fact that two frequency combs, while drifting in frequency over time (master oscillator was not locked), they do so together, strictly maintaining their relative frequency/phase relations.

Still referring to FIG. 4, after spectral decomposition, the SCF is estimated by taking the vector outer product of the physically generated DFT components from comb-assisted physical pre-processor 42 with the conjugate of itself in correlator 44. The entire process is repeated and averaged over time (48), varied with different signal stimuli.

An experimental comb generation arrangement based on a highly non-linear fiber (HNLF) is depicted in FIG. 5A. This example is provided as one possible frequency comb architecture that could be used to implement the mutually coherent combs for physically-assisted generation of DFT components according to the invention. Use of fiber as a nonlinear waveguide is trivially replaced by silicon waveguide, or any other material exhibiting sufficient nonlinearity. Accordingly, this example is not intended to be limiting, and it will be apparent to those in the art that other comb architectures may be used to achieve the mutually coherent behavior that lies at the heart of the invention.

Two tunable optical combs 162, 163 ($TOC_1$ and $TOC_2$) were generated using a cavity-less seed source, as shown in the experimental setup in FIG. 5B. The master seed for both TOCs 162, 163 was a single, narrow-linewidth master oscillator 160 operating at 1559.2 nm. Each TOC includes a pulse generation stage 150, a pulse compression stage 152 and a comb generation stage 153, as shown in FIG. 16A. The master oscillator was split into two paths with a 3 dB coupler 173 to seed both TOCs. In TOC 162, broad optical pulses were carved with an electro-optical modulator 165, which uses the RF signal, in this case, a 25 GHz RF tone 161, to modulate the optical carrier. In the test set-up, a Mach-Zehnder modulator (MZM) was employed, however, it will be apparent to one of skill in the art that other types of optical modulators may be used to achieve appropriate modulation. Next, in pulse compression stage 152, the broad pulses were first chirped using a phase modulator (PM) 166 driven with the 25 GHz tone 161. The chirped pulses were then compressed in single mode fiber (SMF) 167. After amplification and subsequent filtering, the pulses were subjected to a second compression stage. The chirp in this stage was induced by self-phase modulation (SPM) in a highly nonlinear fiber (HNLF) 168. The pulse compression was again achieved in a second SMF stage 169. Next, the pulse pedestals were suppressed in a nonlinear optical loop mirror (NOLM) 170. Finally, the high peak power pulses were routed into a final HNLF stage 171 for generation of a wideband 25 GHz optical frequency comb. The high quality 25 GHz TOC with $OSNR_{0.1nm}$ over 40 dB and 0.02 nm resolution bandwidth is shown in FIG. 6. The second TOC 163 was generated as described for the first TOC but with a pitch of 24.92 GHz, resulting in a pitch offset of 80 MHz between the two generated combs.

Referring to FIG. 5B, the 25 GHz TOC 162 was sent to a MZM 175 driven with an RF 25 GHz tone, where the received electrical signal was modulated onto each of the comb tones. The electrical signal was synthesized using a 64 GS/s digital to analog converter (DAC) 176. The DAC 176 was programmed with the test data and was electrically amplified and used to modulate the comb. After the comb generation, the signal comb was modulated by the electrical input test signal. This effectively replicated the incoming electrical signal onto each of the 250 optical carriers. Next, both optical frequency combs were sent to two separate programmable optical filters (TOF 177, 178). The filters were used to emulate an AWG, whereby each optical mode was sequentially filtered out individually. This example illustrates equivalent-time capture. In a real-time embodiment, TOF elements are eliminated and a detector array is used to replace the single coherent detector element shown in this example. For embodiments employing a multiple element array, the number of elements in the detector array may, but need not, match the number of optical tones. In other words, there may be more or fewer detector elements than there are sub-bands.

In a practical device that possesses a full complement of backplane detectors, TOF is eliminated as each pair of signal replica and LO tone is sent to a dedicated detector element. The pair of overlapping signal and reference comb tones were then amplified with either C- or L-band erbium doped fiber amplifiers (EDFA) 179 before being sent to a 40 GHz hybrid detector 180. The output was then sent to an electrical ADC 182 whose bandwidth and sampling rate were set to 80 MHz. After the capture, the programmable optical filters 177, 178 were then tuned to select the next pair of overlapping optical tones. Finally, post-processing was applied after all 250 optical modes were captured by the ADC 182.

The electrical test signal was generated using a 60 GS/s DAC. The DAC was used to synthesize both the signal and noise. The signal consisted of 4 GHz quadrature phase shift keyed (QPSK) raised cosine shaped data with 0.25 rolloff factor and upconverted to 2.5 GHz carrier. Additionally, a 2 GHz wide, 8-PSK raised cosine-shaped signal and an 800 MHz binary phase shift keyed (BPSK) raised cosine-shaped signal were also generated and upconverted to 6 GHz, and 9 GHz, respectively. The three signals were simultaneously stimulated with noise to achieve an in-band SNR of 15 dB, 10 dB, and 5 dB. The digital signal stimuli and noise spectrum are illustrated in FIG. 7. The generated electrical signal was then amplified and used to modulate the 25 GHz signal comb utilizing a null-biased MZM.

The digital signal processing (DSP) that was applied at the receiver consisted of channel timing and phase alignment, filtering and subsequent downsampling to 80 MHz in order to estimate the 250 DFT coefficients over a 12.5 ns window. The SCF function was then calculated by taking the vector outer product of the estimated DFT coefficients with the conjugate of itself. The process was repeated and averaged over an approximately 4.2 µs time window, corresponding to 333 total averages. The number of averages was limited by the total memory depth of the DAC utilized.

To test the performance of the inventive CS analyzer architecture, the SCF was calculated in two ways. First, the SCF was simulated in the digital domain, computing the 250 point DFT, and subsequently yielding the SCF estimation. The estimation was reached by averaging 333 realizations of the SCF of the input electrical signal. Secondly, the electrical signal was then sent into the CS receiver whereby the 250 DFT coefficients were estimated using the new architecture, and the SCF estimation was then reached by averaging 333 realizations of the SCF. The estimated SCF was then compared with the simulated SCF. The simulated SCF and experimental SCF for an input SNR of 15 dB are shown in FIGS. 8A and 8B, respectively. In both plots, distinct features appear in the $\alpha$-f domain, as expected from the QPSK, 8-PSK, and BPSK modulated signals. We note that simulated and experimental results match extremely well, both with respect to feature extraction and overall magnitudes. Indeed, for a BPSK signal, strong spectral correlation exists at the carrier frequency rate $\alpha=f_0$, at the modulation rates $\alpha=\pm\Delta f$, and at $\alpha=f_0\pm\Delta f$ [30], as indicated in FIGS. 8A and 8B. For QPSK and 8-PSK, strong spectral correlation does not exist at the carrier frequency, due to the modulation being balanced between in-phase and quadrature components[30]. In both the simulated and experimental data, strong spectral correlation for QPSK and 8-PSK is indeed only observed at the keying rates $\alpha=\pm\Delta f$, as depicted in FIGS. 8A and 8B.

The proposed system was also characterized in lower SNR regimes. This was achieved by increasing the noise power relative to the signal in the digital domain before uploading the data to the DAC. For an input SNR of 10 dB, the simulated and experimentally estimated SCF are plotted in FIGS. 9A and 9B, respectively. Even at this lower input SNR, both the simulated and the computationally efficient experimental SCF exhibit strong features in the cyclic domain. Also, even in the lower SNR regime, the experimental data matches closely with the simulated data, with features that match well with the analytic expectation.

Remarkably, even when the system SNR was lowered to 5 dB, similar agreement was maintained between the simulation and experiment. Even in this low SNR regime, the simulated SCF matched closely with the low complexity experimental SCF, as shown in FIGS. 10A and 10B. In both cases, strong spectral correlation peaks are observed in the cyclic domain that match the theoretically predicted features.

Specifically, for an environment with large interfering noise, where the signal is only 5 dB above the noise, high confidence signal detection and classification can be achieved with low computational complexity utilizing the new experimental architecture.

A prototype CS receiver was designed, constructed and packaged within a standard telecommunication module. This portable system operated over 38 GHz bandwidth with 200 MHz spectral resolution. To validate the receiver performance, a 2 GHz BPSK signal up-converted to 2 GHz carrier frequency was used as a stimulus to the system. A sample output of the experimental system for calculating the SCF function of the input is shown in FIG. 11.

The ultrawideband cyclostationary receiver disclosed herein eliminates the need for full-band digitization and real-time Fourier computation. The low complexity of the new wideband receiver is made possible by generating a Fourier representation in the physical domain. The received field can be decimated in the spectral domain using tunable, coherently coupled frequency combs derived from a single master oscillator. The CS receiver can be used to generate the SCF of multiple RF signal stimuli, and under varied SNR conditions. While the examples described herein used only 250 comb tones to demonstrate the feasibility of computation-free Fourier mapping in a CS receiver, it will be readily apparent to those in the art that parametric combs operating with thousands of tones will allow for considerably higher performance, both with respect to spectral resolution and signal selectivity.

REFERENCES (DISCLOSURES ARE INCORPORATED HEREIN BY REFERENCE)

[1] G. W. Anderson. D. C. Webb, A. E. Spezio, and J. N. Lee, "Advanced Channelization Technology for RF, Microwave, and Millimeterwave Applications," *Proc. IEEE*, vol. 79, no. 3, pp. 355-388, March 1991.

[2] A. O. J. Wiberg, D. J. Esman, L. Liu, J. R. Adleman, S. Zlatanovic, V. Ataie, E. Myslivets, B. P. P. Kuo, N. Alic, E. W. Jacobs, and S. Radic, "Coherent filterless wideband microwave/millimeter-wave channelizer based on broadband parametric mixers," *J. Lightw. Technol.*, vol. 32, no. 20, pp. 3609-3616, October 2014.

[3] W. Wang, R. L. Davis, T. J. Jung, R. Lodenkamper, L. J. Lembo, J. C. Brock, and M. C. Wu, "Characterization of a coherent optical RF channelizer based on a diffraction grating," IEEE Trans. Microw. Theory Tech., vol. 49, no. 10, pp. 1996-2001, October 2001.

[4] X. Xie, Y. Dai, K. Xu, J. Niu, R. Wang, L. Yan, and J. Lin, "Broadband photonic RF channelization based on coherent optical frequency combs and I/Q demodulators," IEEE Photon. J., vol. 4, no. 4, pp. 1196-1202, August 2012.

[5] H. L. Hurd, "An investigation of periodically correlated stochastic processes", Ph.D. Dissertation, Duke University, Durham, N.C., 1969.

[6] W. A. Gardner, "Representation and estimation of cyclostationary processes", Ph.D. Dissertation, Department of Electrical and Computer Engineering, University of Massachusetts, reprinted as Signal and Image Processing Lab Technical Report No. SIPL-82-1, Department of Electrical and Computer Engineering, University of California, Davis, Calif., 95616, 1982, 1972.

[7] W. A. Gardner, A. Napolitano, L. Paura, "Cyclostationarity: Half a century of research," *Signal Proc.*, vol. 86, no. 4, pp. 639-697, April 2006.

[8] Vecchia, A. V., "Periodic autoregressive-moving average (PARMA) modeling with applications to water resources," Water Res. Bull., vol. 21, no. 5, pp. 721-730, October 1985.

[9] Y. P. Dragan, and I. Yavorskii, "The periodic correlation-random field as a model for bidimensional ocean waves," *Peredacha Informatsii*, vol. 51, pp. 15-25, 1982.

[10] P. Bloomfield, H. L. Hurd, and R. B. Lund, "Periodic Correlation in Stratospheric Ozone Data," *J. of Time Series Analysis*, vol. 15, no. 2, pp. 127-150, March 1994.

[11] D. Konig, and J. R. Bohme, "Application of cyclostationary and time-frequency signal analysis to car engine diagnosis,"*Acoustics, Speech, and Sig. Proc.*, vol. 4, pp. 149-152, April 1994.

[12] T. Li, T. Qiu, and H. Tang, "Optimum heart sound signal selection based on the cyclostationary property," *Computers in Biology and Medicine*, vol. 43, pp. 607-612, March 2013.

[13] E. Parzen, and M. Pagano, "An approach to modeling seasonally stationary time series," *J. of Econometrics*, vol. 9, pp. 137-153, 1979.

[14] J. Dederer, B. Schleicher, F. De Andrade Tabarani Santos, A. Trasser, and H. Schumacher, "FCC compliant 3.1-10.6 GHz UWB pulse radar system using correlation detection," *Proc. IEEE MTT-S Int. Microw. Symp. Dig.* 2007, pp. 1471-1474. 2007.

[15] R. H. Walden, "Analog-to-digital converter survey and analysis," IEEE J. Sel. Areas Commun., vol. 17, no. 4, pp. 539-550, April 1999.

[16] B. Murmann. ADC performance survey 1997-2015. [Online]. March 2015.

[17] U. Meye-Baese, "Fourier Transforms," in *Digital Signal Processing with Field Programmable Gate Arrays, 4th* Ed. Springer, 2014, pp. 417-464.

[18] A. Tkachenko, D. Cabric, and R. W. Brodersen, "Cyclostationary Feature Detector Experiments using Reconfigurable BEE2," in *Proc. IEEE Int. Symposium on New Frontiers in Dynamic Spectrum Access Networks*, Dublin, Ireland, pp. 216-219, April 2007.

[19] T. Yucek and H. Arslan, "A survey of spectrum sensing algorithms for cognitive radio applications," IEEE Commun. Surveys Tutorials, vol. 11, no. 1, pp. 116-130, First Quarter, 2009. S. T. Cundiff, and J. Ye, "Colloquium: Femtosecond optical frequency combs," *Rev. Mod. Phys.*, vol. 75, no. 1, pp. 325-342, March 2003.

[20] R. S. Roberts, "Architectures for Digital Cyclic Spectral Analysis," PhD Dissertation, Department of Electrical Engineering and Computer Science, University of California, Davis, 1989.

[21] W. A. Gardner, "Cyclostationarity In Communications and Signal Processing," New York: IEEE Press, pp. 455-479, 1994.

[22] Kyouwoong Kim, Akbar, I. A., "Cyclostationary Approaches to Signal Detection and Classification in Cognitive Radio," DySPAN $2^{nd}$ IEEE International Symposium on, pp. 212-215, 2007.

[23] A. J. Viterbi, "CDMA: principles of spread spectrum communication", Addison Wesley Logman Publishing Co., Inc. Redwood City (1995).

[24] G. W. Bewick, "Fast Multiplication: Algorithms and Implementation," Ph.D. Dissertation, Stanford University, Stanford, Calif., 1994.

[25] E. Pop, S. Sinha, and K. E. Goodson, "Heat Generation and Transport in Nanometer-Scale Transistors,"*Proc. IEEE*, vol. 94, no. 8, pp. 1587-1601, 2006.

[26] P. Del'Haye, O. Arcizet, A. Schliesser, R. Holzwarth, and T. J. Kippenberg, "Full stabilization of a microresonator-based optical frequency comb," *Phys. Rev. Lett.*, vol. 101, no. 5, July 2008.

[27] R. Wu, V. R. Supradeepa, C. M. Long, D. E. Leaird, and A. M. Weiner, "Generation of very flat optical frequency combs from continuous-wave lasers using cascaded intensity and phase modulators driven by tailored radio frequency waveforms," *Opt. Lett.*, vol. 35, no. 19, pp. 3234-3236, October 2010.

[28] L. P. Barry, R. Watts, E. Marthin, C. Browning, K. Merghem, C. Calò, A. Martinez, R. Rosales, and A. Ramdane "Characterization of optical frequency combs for OFDM based optical transmission systems,"*Proc. Inter. Conf on Fibre Opt. and Phot.*, Paper W2A.2 2012.

[29] V. Ataie, B. P.-P. Kuo, E. Myslivets, and S. Radic, "Generation of 1500-tone, 120 nm-wide ultraflat frequency comb by single CW source," presented at the Opt. Fiber Commun. Conf., Anaheim, Calif., USA, 2013, Paper PDP5C.1.

[30] W. A. Gardner, W. A. Brown III, C.-K. Chen, "Spectral Correlation of Modulated Signals: Part II-Digital Modulation," *IEEE Trans. On Comm.*, vol. 35, no. 6, June 1987.

The invention claimed is:

1. A signal analyzer for analyzing an input signal to remove noise, the signal analyzer comprising:

a mutually coherent frequency comb pair comprising a first comb and a second comb, the second comb having a frequency pitch offset with respect to a frequency pitch of the first comb, each comb generating a plurality of optical tones, wherein the output of the first comb has mapped thereon the input signal, and wherein the comb pair generates a plurality of spectrally overlapping optical tone pairs, each overlapping optical tone pair comprising a single input signal copy from the first comb and a different optical tone from the second comb;

an optical demultiplexer configured for receiving the plurality of overlapping optical tone pairs and spectrally separating each overlapping optical tone pair into a plurality of sub-bands;

a detector array configured for receiving and converting each overlapping optical tone pair into an electrical frequency component of the input signal, wherein the detector array outputs a plurality of discrete Fourier transform (DFT) components corresponding to the plurality of overlapping optical tone pairs; and a processor configured to determine a spectral correlation among the DFT components, wherein non-correlated DFT components represent noise and correlated DFT components represent signal, the processor further configured to average the correlated DFT components to generate a representation of the input signal with noise removed.

2. The signal analyzer of claim 1, wherein the input signal is in a radiofrequency (RF) domain and the CS analyzer further comprises a modulator for mapping the input signal onto the output of the first comb after comb generation.

3. The signal analyzer of claim 2, wherein the modulator comprises an electro-optical modulator.

4. The signal analyzer of claim 1, wherein the input signal is in an optical domain, and further comprising a multiplexer for combining the input signal with a seed prior to comb generation.

5. The signal analyzer of claim 1, wherein the detector array comprises a plurality of detector elements, each detector element is configured to receive at least one overlapping optical tone pair.

6. The signal analyzer of claim 5, wherein a number of detector elements of the plurality matches a number of overlapping optical tone pairs.

7. The signal analyzer of claim 5, wherein a number of detector elements of the plurality is smaller than a number of overlapping optical tone pairs.

8. The signal analyzer of claim 1, wherein the separated overlapping optical tones pairs are input into separate optical waveguides in optical communication with the detector.

9. A method for cyclostationary (CS) analysis of an input signal, the method comprising:
replicating the input signal onto a first optical frequency comb having a frequency pitch, the first optical frequency comb configured for generating a first plurality of optical tones, each optical tone of the first plurality having a replica of the input signal mapped thereon;
generating a second plurality of optical tones using a second optical frequency comb having a pitch offset relative to the first optical frequency comb, the first and second optical frequency combs being frequency-locked by a common emission seed;
splitting each replica from the first comb and at least one corresponding tone from the second comb into separate optical waveguides;
receiving the output of each optical waveguide at a coherent receiver, each optical waveguide carrying a separated replica of the input signal and at least one corresponding tone from the second comb;
converting each separated replica into an electrical sub-band of the input signal, wherein each electrical sub-band represents a discrete Fourier transform (DFT) component of the input signal;
determining a spectral correlation among the DFT components, wherein non-correlated DFT components represent noise and correlated DFT components represent signal; and
averaging correlated DFT components to generate a representation of the input signal with noise removed.

10. The method of claim 9, wherein the input signal is in a radiofrequency (RF) domain, and wherein replicating comprises mapping the input signal onto the first optical frequency comb after comb generation.

11. The method of claim 9, wherein the input signal is in an optical domain, and wherein the input signal is combined with the seed prior to generation of the first optical frequency comb.

12. The method of claim 9, wherein splitting is achieved by inputting the optical tones into an optical demultiplexer.

13. A method for cyclostationary (CS) analysis of an input signal, the method comprising:
separating the input signal into a plurality of sub-bands by modulating the input signal onto a first optical frequency comb of a mutually-coherent optical comb pair, wherein the optical comb pair comprises a second optical frequency comb having a pitch offset relative to the first optical frequency comb, and wherein each sub-band corresponds to an optical tone in a spectral domain; and
detecting and converting the optical tones into electrical subcomponents of the input signal, wherein each electrical subcomponent represents a discrete Fourier transform (DFT) component of the input signal;
calculating a spectral correlation among the DFT components, wherein non-correlated DFT components represent noise and correlated DFT components represent signal; and averaging the correlated DFT components to reconstruct the input signal.

14. The method of claim 13, wherein the input signal is in a radiofrequency (RF) domain, and wherein replicating comprises mapping the input signal onto the first optical frequency comb after comb generation.

15. The method of claim 13, wherein the input signal is in an optical domain, and wherein the input signal is combined with the seed prior to generation of the first optical frequency comb.

16. The method of claim 13, wherein calculating the spectral correlation comprises taking a vector outer product of the DFT component with a conjugate of itself.

17. The method of claim 9, wherein calculating the spectral correlation comprises taking a vector outer product of the DFT component with a conjugate of itself.

18. The signal analyzer of claim 1, wherein the processor calculates spectral correlation by taking a vector outer product of the DFT component with a conjugate of itself.

19. A method for reconstructing an input signal, the method comprising:
spectrally decomposing the input signal into a plurality of overlapping optical tone pairs by modulating the input signal onto a first optical frequency comb of a mutually-coherent optical comb pair, wherein the mutually-coherent optical comb pair comprises a second optical frequency comb having a pitch offset relative to the first optical frequency comb;
detecting and converting the overlapping optical tone pairs into electrical subcomponents of the input signal, wherein each electrical subcomponent represents a discrete Fourier transform (DFT) component of the input signal;
calculating a spectral correlation among the DFT components, wherein non-correlated DFT components represent noise and correlated DFT components represent signal; and
averaging the correlated DFT components to reconstruct the input signal.

20. The method of claim 19, wherein detecting and converting comprises receiving the overlapping optical tone pairs in a detector array comprising a plurality of detector elements, each detector element configured to receive at least one overlapping optical tone pair.

21. The method of claim 19, further comprising, prior to detecting and converting, splitting the overlapping optical tone pairs into separate optical waveguides.

22. The method of claim 19, wherein calculating the spectral correlation comprises taking a vector outer product of the DFT component with a conjugate of itself.

23. The method of claim 19, wherein the input signal is in a radiofrequency (RF) domain, and wherein replicating comprises mapping the input signal onto the first optical frequency comb after comb generation.

24. The method of claim 19, wherein the input signal is in an optical domain, and wherein the input signal is combined with the seed prior to generation of the first optical frequency comb.

* * * * *